Figure 1:
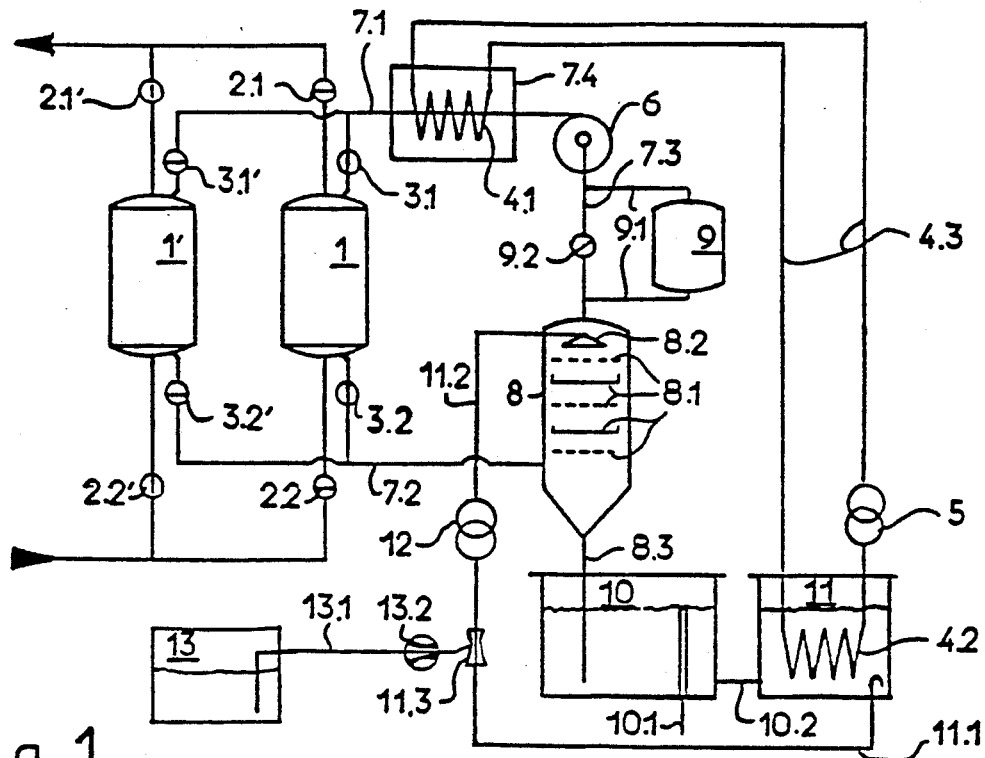

United States Patent [19]

Peinze

[11] Patent Number: 5,069,038
[45] Date of Patent: Dec. 3, 1991

[54] PROCESS FOR REMOVERING DESORBATE PRODUCED IN THE DESORPTION OF LADEN SORPTION MATERIAL, AND APPARATUS THEREFOR

[75] Inventor: Reinhold Peinze, Selm, Fed. Rep. of Germany

[73] Assignee: Rekuerator KG Dr.-Ing. Schack & Co., Düsseldorf, Fed. Rep. of Germany

[21] Appl. No.: 265,783

[22] Filed: Nov. 1, 1988

[30] Foreign Application Priority Data

Nov. 1, 1987 [DE] Fed. Rep. of Germany ....... 3737408

[51] Int. Cl.$^5$ ................................. F25J 3/00
[52] U.S. Cl. .......................... 62/18; 55/59; 55/71; 502/34
[58] Field of Search ............ 62/18; 55/59, 68, 71; 502/34

[56] References Cited

U.S. PATENT DOCUMENTS

| | | | |
|---|---|---|---|
| 4,421,532 | 12/1983 | Sacchetti et al. | 55/59 |
| 4,589,890 | 5/1986 | Gronvaldt | 55/59 |
| 4,738,694 | 4/1988 | Godino et al. | 55/59 |

FOREIGN PATENT DOCUMENTS

| | | |
|---|---|---|
| 2936873 | 4/1981 | Fed. Rep. of Germany . |
| 3042082 | 5/1982 | Fed. Rep. of Germany . |
| 3303423 | 9/1986 | Fed. Rep. of Germany . |
| 3201390 | 5/1987 | Fed. Rep. of Germany . |
| 3637803 | 5/1988 | Fed. Rep. of Germany . |

OTHER PUBLICATIONS

Wärme, vol. 87, Book 3, "Wärmerecycling mit Hochtemperatur-Wärmepumpen", pp. 49–56.

Primary Examiner—Ronald C. Capossela
Attorney, Agent, or Firm—Herbert L. Lerner; Laurence A. Greenberg

[57] ABSTRACT

A process for recovering the desorbate produced by the desorption of laden sorption materials by circulating a desorption gas through the materials includes the steps of:
a) heating the desorption gas prior to its introduction into the sorption material.
b) the desorption gas is circulated through the sorption material.
c) the desorption gas is removed from the sorption material, the gas being laden with desorbate.
d) the laden desorption gas is cooled in a direct heat exchanger, cooled by a coolant to condense, unload, and liquify the desorbate from the laden gas, the coolant being super-cooled recovered desorbate.
e) the liquified condensed desorbate is collected and super-cooled for use as a coolant.
f) the unladen desorption gas is removed from the liquid desorbate and the desorption gas is reheated and recirculated through steps a)-c).

11 Claims, 1 Drawing Sheet

PROCESS FOR REMOVING DESORBATE PRODUCED IN THE DESORPTION OF LADEN SORPTION MATERIAL, AND APPARATUS THEREFOR

The invention relates to a process for recovering the desorbate produced in the desorption of laden sorption materials, using a circulated desorption gas, which is heated prior to its entry into the sorption material and is cooled after its leaving or exit from the sorption material The recovery of the desorbate from the laden sorption material, is by condensation. The desorbate-containing desorption gas is liquefied, by cooling to condensation. The sorbents are "steamed out" with water vapor, and then the water vapor, with the entrained desorbate, is liquefied in a following cooler. When a permanent gas is used as the desorption gas, the desorbate-containing desorption gas is cooled to at least below the temperature of condensation of the desorbate, and the desorbate then settles out in liquid form. For cooling, an indirect heat exchanger is used, and a coolant lowers its inner walls to the necessary temperature of condensation. Upon condensation, the desorbate liquefies on the cooled walls, runs downward, and can be removed and reserved. German Patent 32 01 390 describes such a process, in which the heat removed from the desorbate-containing desorption gas as it is cooled is resupplied to the desorption gas in order to preheat it prior to its introduction entry into the desorption materials to be desorbed this heat thus is available and usable for the desorption, by a heat pump assembly means with a closed heat cycle. The evaporator aspect of the heat pump assembly is connected as a cooler for the desorbate-containing desorption gas and serves as a condenser for the desorbate, while the liquefier aspect of the heat pump assembly is connected as a heat exchanger which gives up its heat to the desorption gas flowing into the sorption materials. With such a heat pump assembly, the proportion of energy measured in terms of the desorption energy that must be externally supplied can be reduced considerably, which makes the process particularly economical.

This type of cooling presents problems in the desorption of organic substances having high boiling points, because in the vicinity of the surfaces substantially cooled to below the temperature of condensation, some areas are at a temperature below the threshold cooling temperature of the substance in question, so that a fog forms, because of supersaturation. The fog particles then remain suspended and entrained in the desorption gas and are returned with it to the sorption materials, which evaporate in the vicinity of the heat source and thus increase the partial pressure of these organic substances in the desorption gas. As a result, the sorption materials cannot be sufficiently desorbed, because sufficient desorption occurs only if the partial pressure of these organic substances in the desorption gas is kept quite low.

In the desorption of organic substances that decompose readily—primarily halogenated hydrocarbons—problems are to be expected. In this case they arise because the desorption temperature must be kept below the decomposition temperature in order to avoid autocatalytic decomposition of the halogenated hydrocarbon in the presence of water. Autocatalytic decomposition leads to the production of halo-or haloid acids, which can cause corrosion damage to the equipment in the desorption gas cycle. This is particularly true when the absolute content of water vapor must be limited, as for instance when the sorption apparatus includes a molecular sieve. The halogen acids produced upon decomposition of the halogenated hydrocarbons when circulated along with the desorbate gas, attack the molecular sieve, reducing its capacity to trap water. Because the water content in the desorbate cycle then increases, the haloid or halogen acids promote the accelerated decomposition of the halogenated hydrocarbons, which in turn increases the haloid acid content, which finally accelerates the corrosive attack.

The object of this invention is to improve the aforesaid process by avoiding the problems discussed above, the desorbate recovery can be performed independently, whether the problems are those associated with organic substances having a high boiling point and tending to form fogs, or with substances having a low boiling point and tending to decompose, such as halogenated hydrocarbons.

In an unexpectedly simple manner, this object is attained in accordance with the modification of the invention; further features and preferred exemplary embodiments are also disclosed.

By means of this invention, the closed desorption gas cycle is conducted via a direct heat exchanger, in which the desorption gas, cooled to below the temperature of condensation of the desorbate, is directly contacted with returned desorbate. The returned desorbate has been supercooled to a temperature that (taking the partial pressure into account) is sufficiently below the temperature of condensation of the desorbate, and is cooled down thereby. The condensate is absorptively received by liquid desorbate introduced into the direct heat exchanger. This is equivalent to direct condensation in which there is good heat transfer at low temperature differences because heat exchanger surfaces that might hinder the heat transfer are absent. As a consequence of the low temperature difference, fog does not form. Because of the absence of fog formation, the remaining desorbate content entrained in the desorption gas is kept low. Even after heating, the partial pressure of the desorbate still is equivalent to that of the temperature of condensation. More effective desorption of the sorbents thus becomes possible.

In substances having low boiling points, an absorption of any haloid acids that have been produced is attained. In the liquid phase, the recovered desorbate can then be correspondingly treated and prepared in such a way that it is simple to make provisions for avoiding any decomposition of the halogenated hydrocarbons in this liquid phase.

Since direct cooling with condensation involves absorption, it does not matter much whether the cooler is operated with a co-current or counter-current flow. If a large amount of condensation heat is produced, thus more severely heating the supercooled desorbate that is introduced, a counter-current apparatus may be more advantageous, because then the remaining desorbate content is determined very substantially by the entry temperature of the supercooled desorbate in the vicinity of the gas outlet.

It is advantageous if the heat removed from the liquid desorbate when it is supercooled is transferred back to the desorption gas, by a heat pump assembly the evaporator portion of which draws heat from the liquid desorbate. The coolant cycle of the heat pump array transfers this heat to the liquefier portion, which in turn gives up the heat to the desorption gas.

It will be understood that cascade assemblies can be used here as well, especially if relatively large temperature differences are generated. It will also be understood that unless it can be assured directly by the heat pump assembly, the desorption temperature will be maintained by an additional after-heater. In view of its minimal added heating requirement, however, this after-heater may be designed with a smaller capacity, that is, its capacity can be smaller by the amount of heat transferred by the heat pump assembly.

For good supercooling of the liquid desorbate that is to be delivered to the direct heat exchanger, it is advantageous if the cooling of the liquid desorbate takes place in the line through which it is delivered to the direct heat exchanger. To this end, this line is embodied as and functions as a heat exchanger, for instance by incorporating a coil, forming the evaporator, or by sheathing it, the sheath being embodied as an evaporator. In this arrangement, the unavoidable lost heat of the pump that pumps the liquid desorbate is eliminated simultaneously as well.

If a relatively large amount of condensate heat is produced, then it may be advantageous to have the desorbate collected in a tank and cooled. One expedient, would be to have the heat pump assembly evaporator housed in this tank. As a result, as much as possible of the heat absorbed by the desorbate is made available. It will be understood that the two arrangements may also be combined.

The process becomes particularly effective with a view to preventing the decomposition of halogenated hydrocarbons whenever an acid binder (stabilizer or acid acceptor) is added to the recovered desorbate to be introduced into the direct heat exchanger. Such stabilizers or acid acceptors are known from German Published, Prosecuted Application DE-AS 1 084 713. They are mixtures of at least one organic hydrazine compound, an alcohol, an epoxide and a phenol. They suppress the autocatalytic decomposition of halogenated hydrocarbons, and in the liquid phase they bind any haloid acids that may have been released. These functionally neutralize the free acids, which prevents such haloid acids from steaming out during the dwell time of the liquid desorbate in the desorption gas cooler. Since the water content is necessary for the decomposition of the halogenated hydrocarbons, the moisture content of the desorption gas is suitably monitored, and as a function of this moisture content, a metered addition of these free acid binders is performed. Monitoring the moisture content of the desorption gas is considered equivalent to monitoring the moisture in the recovered desorbate introduced for cooling purposes. The pump, which is present for introducing the recovered desorbate into the direct heat exchanger, may also be used for admixing the acid binder the negative pressure on the intake side is used to provide aspiration pressure for the acid binder. The metering is performed via a metering valve incorporated into the inlet at the intake side of the pump.

A particularly effective limitation of the decomposition of the halogenated hydrocarbons is attained whenever an eliminator for selectively trapping water and acting as a dryer is incorporated into the desorption gas cycle between the cooler and the heater. Such water eliminators are typically equipped with a molecular sieve, a bed of silicic acid gel or similar desiccating substances. To avoid overburdening such a water eliminator, the desorption gas phase of the process is divided into two partial gas streams, only one of which flows through the water eliminator, while the other to bypasses it. By the control of the adjustment of either of the gas streams, the flow through the water eliminator can be adjusted to any desired or required value between (about) 0% and 100%. Since in desorption, water is generally expelled first, the operating period in which the water eliminator is to be in action is located in the initial phase of desorption. Because the action can be turned on and off, loading of this water eliminator with organic substances (that are expelled later) is avoided. Regulating the one partial stream (which results in an equilibrated regulation of the other partial stream) makes it possible to continuously adapt the gas stream which flows through the water eliminator, to existing operating conditions. Such an adaption is provided when the water content of the desorption gas is monitored and used as a control variable for the partial stream throttle valve setting.

Other features which are considered as characteristic for the invention are set forth in the appended claims.

Although the invention is illustrated and described herein as embodied in a process for recovering desorbate produced in the desorption of laden sorption material, and apparatus therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
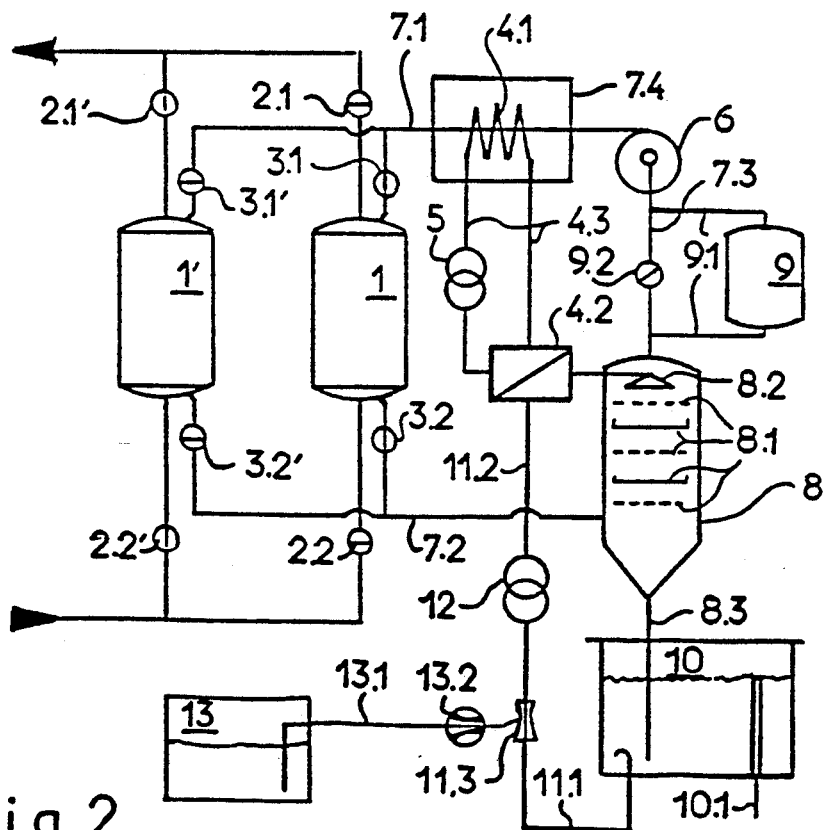

FIGS. 1 and 2 are schematic circuit diagrams of apparatus provided by way of example for explaining the process according to the invention.

Referring now to the figures of the drawing and first, particularly, to FIG. 1 thereof, there are seen two adsorbers 1 and 1' filled with sorption materials which are incorporated into a gas scrubbing system and can be selectively disconnected from the through gas flow via the valves 2.1, 2.2 and 2.1', 2.2'. In the example shown, the adsorber 1' is connected for gas scrubbing, while there is no flow of gas to be scrubbed through the adsorber 1, which is shown with closed valves. For desorption, both adsorbers 1 and 1' are connected to a desorption cycle: the valves 3.1 and 3.1' are disposed upstream of the entry of desorption gas into the adsorber, the valves 3.2 and 3.2' are disposed downstream of the desorption gas outlet from the adsorber. This makes it possible to incorporate the adsorber 1, which is taken out of the gas scrubbing operation, into the desorption gas cycle with opened valves 3.1 and 3.2, as shown. Nitrogen or a low-oxygen inert gas is used as the desorption gas.

The desorption gas is pumped by the blower 6 in the cycle that is closed by the connecting lines 7.1, 7.2 and 7.3. The line 7.1 connects the outlet of the blower 6 to the adsorber 1, in which the desorption material to be desorbed is located. The line 7.2 leads from this adsorber 1 to the direct cooler 8, and the line 7.3 leads back from there to the blower 6. An indirect heat exchanger, the heater 7.4, is incorporated into the line 7.1, and in it the heat given up by an evaporator 4.1 of a heat pump assembly is transferred to the desorption gas. In order to dry the desorption gas, a water-selective adsorber 9 can be incorporated; it is advantageously connected parallel to the line 7.3, and a control valve 9.2 is located in this line 7.3. With the aid of this control valve, the desorption gas stream flowing through the adsorber 9 functioning as a dryer can be adjusted from virtually 0% to 100%. If a control drive mechanism is provided, regulation, i.e., closed-loop control, can also be performed; for example, the moisture content of the desorption gas can be used as a measured variable effecting the regulation. If the adsorber 9 functioning as a dryer is to be fully disconnectable from the desorption gas stream, then it is advantageous to include a shutoff valve in the adsorber inflow line 9.1. Since the adsorber 9 connected as a dryer also serves as a temperature and water reservoir, absorbing heat and giving off water during the cooling phase, the temperature of the desorption gas can also be considered as a further measured variable. It will be understood that the operating state must be taken into account in this respect, because the adsorber 9 functioning as a dryer operates in water-adsorbent fashion during the desorption of the sorption materials in the adsorber 1, while during the cooling phase of the sorption materials in the adsorber 1 it is itself desorbed, by the expulsion of water vapor.

In the direct heat exchanger 8, the desorbate-containing desorption gas comes into contact with recovered desorbate from the cooling tank 11. Supercooling of the desorption gas is effected by a heat pump assembly evaporator unit 4.2, which is located in the cooling tank 11. The evaporator 4.2 communicates on one connection side with the intake side of the compressor 5, the pressure side of which leads via one of the two lines 4.3 to the liquefier or condenser 4.1 in the heater 7.4. The second line 4.3 carries the coolant of the heat pump assembly cycle, which has been liquefied in the liquefier 4.1, back to the evaporator 4.2; upstream of its entry, a throttle restriction enables regulated evaporation and hence effective cooling of the recovered desorbate present in the cooling tank 11. After supercooling, the recovered desorbate is aspirated from the cooling tank 11 by the feed pump 12, via the line 11.1, and is introduced via the line 11.2 into the direct heat exchanger 8. This introduction is effected via a distributor 8.2; the introduced desorbate flows or trickles via the fittings or fillings—here shown in the form of perforated plates and trays 8.1—of the direct heat exchanger and in so doing absorbs both heat and condensed desorbate. Having been heated, and increased in quantity by the condensed-out desorbate, the desorbate leaves the heat exchanger via the line 8.3, which discharges into the collecting container 10 for the recovered desorbate, where in order to complete the desorbate cycle it is submerged below the surface of the fluid. A constant fluid level is maintained in the supply tank 10 for the recovered desorbate by means of an overflow tube 10.1, through which excess desorbate is removed from the supply tank to a collecting tank not shown. The cooling tank 11 is disposed separately from the supply tank 10, communicating with the supply tank 10 via the line 10.2 and thus having the same fluid level (it will be understood that in closed fluid containers—as are required particularly with substances having low boiling points there is a pressure equilibrium above the surface of the fluid). Heat is removed from the recovered desorbate overflowing into the cooling tank 11 by means of the heat pump assembly coolant evaporating in the evaporator 4.2; the desorbate is supercooled, and returns, in the form of supercooled recovered desorbate, to the flow for introduction into the direct heat exchanger 8.

A line 13.1 discharges upstream of the intake fitting of the pump 12 into the line 11.1 carrying the supercooled recovered desorbate. This line 11.1 leads to a supply container 13, from which a supply of an acid binder, stabilizer or acid acceptor is fed, as needed. By means of this arrangement, it is possible, without an additional pump and solely as a result of the pressure conditions, for the acid binder that is to be added to be mixed into the super-cooled desorbate flowing to the direct heat exchanger 8. Advantageously, the mixing takes place in an injector 11.3, which substantially increases the suction action and under some conditions means that the substances to be added can also be pumped via a certain difference in height. A throttle restriction 13.2 incorporated into the line 13.1 permits metering and control of the addition. If the throttle restriction 13.2 is embodied as a control throttle, then the additional metering can be adjusted. If the control throttle is provided with an adjusting drive mechanism, it becomes a regulating throttle, with which a regulated delivery of the acid binder or other substances to be additionally metered into the supercooled desorbate can be performed. Such regulation may be made dependent on the moisture content in the desorption gas, for example, or on the water content of the recovered desorbate (suitably measured in the return line 8.3 or tank 11).

The variant process shown in FIG. 2 has a different arrangement of the heat exchanger 4.2 that supercools the liquid desorbate: The heat pump assembly, which comprises the compressor 5, the liquefier 4.1 and the evaporator 4.2, which communicate with one another via the lines 4.3, is arranged here in such a way that the evaporator 4.2 and the line 11.2 carrying the liquid desorbate to be supplied to the direct heat exchanger 8 together form a heat exchanger in which the heat transmission takes place from the line 11.2 to the line 4.3. Thus the liquid desorbate carried in the line 11.2 is supercooled. This arrangement, which can intrinsically also be provided with the inflow segment 11.1 from the supply tank 10 to the pump 12, has the advantage, as shown, of also including the lost heat transferred to the liquid desorbate in the pump 12. If a very low temperature of condensation is involved, then the type of cooling of the liquid desorbate shown in FIG. 2 is preferable.

In view of the cooling of the liquid desorbate, it will be understood that a separate cooling tank 11 is not absolutely necessary; the evaporator 4.2 may also be accommodated or positioned within the supply tank 10. The remote cooling tank 11 may also be omitted if the evaporator 4.2 of the heat pump assembly and the inflow line 11.1 or 11.2 to the direct cooler are combined with one another to form a heat exchanger.

Finally, it is also feasible for the supply tank 10 to be omitted and for the take off of the direct heat exchanger 8 to serve as the "buffer volume" for a desorbate throughput through the direct heat exchanger 8. In that case, the return line 11.1 by way of which the liquid desorbate is supplied to the pump 12 should be directly connected to line 8.3 at the direct heat exchanger 8. Perforated plates and trays may be present—as shown—in the direct heat exchanger 8, and in the same manner ring seals or similar inserts known from process technology can be provided.

EXAMPLE

The process is exemplified by the following: Exhaust air coming from an industrial process containing a solvent-mixture of methylchloride and ethanol is cleaned in a filter, the filter contains activated charcoal, 3000 kg in 2 layers. The exhaust air carries about 100 kg/h of the solvents which are absorbed nearly up to 100 per cent by the charcoal. After an 8-hour adsorption cycle the charcoal containing about 600 to 800 kg is nearly saturated and the solvents are to be recovered.

For this, nitrogen is circulated in a desorption gas loop, by heating to 450 K and passing it through the activated charcoal the solvents adsorbed are stripped. The leaving nitrogen carries the stripped solvents, the rate of which is about 370 kg/h so that the time to condensate the solvents will take about 2 to 3 hours, and the remaining time of the desorption cycle of 5 to 6 hours is enough to cool the desorbed charcoal. The nitrogen containing the solvents is precooled to about 300–320 K, a temperature above the temperature of condensation of the solvents.

To further cool the solvents, the nitrogen is quenched in a direct heat exchanger by a liquid sprayed into it. This liquid is a mixture from methylchloride and ethanol, initially mixed from the solvents used in this industrial process, later from condensed desorbate. The quenching liquid is supercooled down to about 265 K, a temperature being lower than the condensing temperature of the solvents. This is, what the term "super-cooled" means in the invention. This cooling occurs in a heat exchanger which is the vaporizer part of a closed cycle heat pump. The heat transferred by said heat pump is brought to a higher temperature level and this heat may be used to heat or preheat the nitrogen before introduction into the charcoal filter. The liquified desorbate, about 370 kg/h, leaves as the output.

To suppress corrosion problems caused by hydrochloric acid generated by hydrolysis of some of the methylchloride, sodium hydroxide as corrosion inhibitor is added to the quenchning liquid in a concentration of about 50 ppM.

I claim:

1. A process for recovering the desorbate produced by the desorption of laden sorption materials by circulating a desorption gas through said materials, which comprises the steps of:
   a) heating the desorption gas prior to its introduction into the sorption material;
   b) circulating said desorption gas through said sorption material;
   c) removing said desorption gas from said sorption material, said gas being laden with desorbate;
   d) cooling said laden desorption gas in a direct heat exchanger, cooled by a coolant to condense, unload, and liquify said desorbate from said laden gas; said coolant being super-cooled recovered desorbate;
   e) collecting said liquified condensed desorbate and super-cooling same for use as said coolant;
   f) removing the unladen desorption gas from said liquid desorbate and reheating and recirculating said desorption gas through steps a)–c) supra.

2. The process according to claim 1 wherein said desorption gas and said super-cooled desorbate are in co-current flow in direct contact with each other in said direct heat exchanger.

3. The process according to claim 1 wherein said desorption gas and said super-cooled desorbate are in relative counter-current flow in said direct contact heat exchanger.

4. The process according to claim 1 wherein said laden gas is partially precooled before introduction into said direct heat exchanger and the energy recovered from said precooling is utilized to reheat the unladen desorption gas for recirculation in step f).

5. The process according to claim 4 wherein the liquid desorbate coolant prior to introduction into said direct heat exchanger is super-cooled in a feed line leading it to said heat exchanger.

6. The process according to claim 4 wherein the collected desorbate is stored in a supply vessel and a portion thereof is super-cooled in said vessel or an extension thereof before returning said super-cooled desorbate to said direct heat exchanger where it serves as the coolant.

7. The process according to claim 1 wherein to said desorbant gas, prior to introduction to said sorption material, is added an acid-remover material selected from the group consisting of acid binders, acid stabilizers, acid complexers and acid acceptors and mixtures thereof, metered in an amount sufficient to reduce any undesirable effects from any acids released in said process.

8. The process according to claim 7 wherein said addition and metering is adjusted in response to acid-sensing means positioned either in the gas being recirculated or in the collected desorbate.

9. The process according to claim 1 wherein the desorption gas to be recirculated to said sorption material is, at least partially, dehydrated to reduce acid formation therein.

10. The process according to claim 9 wherein said dehydration of said desorption gas is performed by diverting said recycled gas into two streams, from one of said streams the water being removed by passing through a water absorber or dryer.

11. The process according to claim 10 wherein the division of said gas streams is controlled by throttling means positioned in at least one of said streams, said control being in response to water detecting means and adapted to direct a suitable portion of the stream flowing through said absorber to minimize the water content of said desorption gas.

* * * * *

UNITED STATES PATENT AND TRADEMARK OFFICE
CERTIFICATE OF CORRECTION

PATENT NO. : 5,069,038

DATED : December 3, 1991

INVENTOR(S) : Reinhold Peinze

It is certified that error appears in the above-identified patent and that said Letters Patent is hereby corrected as shown below:

On the title page:

Item (54), change "REMOVERING" to -- RECOVERING --; and

Item (73), change "Rekuerator" to -- Rekuperator --.

Signed and Sealed this

Seventeenth Day of August, 1993

*Attest:*

BRUCE LEHMAN

*Attesting Officer*     *Commissioner of Patents and Trademarks*